(12) United States Patent
Vanderwende et al.

(10) Patent No.: US 8,316,039 B2
(45) Date of Patent: Nov. 20, 2012

(54) IDENTIFYING CONCEPTUALLY RELATED TERMS IN SEARCH QUERY RESULTS

(75) Inventors: Lucretia Vanderwende, Sammamish, WA (US); Chris Brockett, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 255 days.

(21) Appl. No.: 12/467,538

(22) Filed: May 18, 2009

(65) Prior Publication Data

US 2010/0293180 A1 Nov. 18, 2010

(51) Int. Cl.
*G06F 17/30* (2006.01)
(52) U.S. Cl. ....................................... 707/759
(58) Field of Classification Search .................. 707/759
See application file for complete search history.

(56) References Cited

U.S. PATENT DOCUMENTS

| | | | |
|---|---|---|---|
| 7,440,947 | B2 | 10/2008 | Adcock et al. |
| 2005/0027691 | A1 | 2/2005 | Brin et al. |
| 2005/0267871 | A1* | 12/2005 | Marchisio et al. ............... 707/3 |
| 2006/0271353 | A1* | 11/2006 | Berkan et al. .................... 704/9 |
| 2008/0313147 | A1 | 12/2008 | Svore et al. |
| 2009/0063472 | A1 | 3/2009 | Pell et al. |
| 2009/0070322 | A1 | 3/2009 | Salvetti et al. |

OTHER PUBLICATIONS

"Conceptual Search", Retrieved at<<http://prestospace.org/project/deliverables/D16-2.pdf>>, Deliverable D16.2 MPA2, Jan. 1, 2007, pp. 41.
Chi, et al."ScentHighlights: Highlighting Conceptually-Related Sentences during Reading", Retrieved at<<http://psychology.stanford.edu/~mgumbrec/ScentHighlights.pdf>>, IUI'05, Jan. 10-13, 2005, San Diego, California, USA, ACM, pp. 3.
Taibi, et al."A Semantic Search Engine for Learning Resources", Retrieved at<<http://www.formatex.org/micte2005/349.pdf>>, FORMATEX 2005, pp. 1-5.
Tran, T., P. Cimiano, S. Rudolph and R. Studer, Ontology-based interpretation of keywords for semantic search, International Semantic Web Conference, ISWC/ASWC'07, Nov. 2007, pp. 523-536.

* cited by examiner

*Primary Examiner* — Rehana Perveen
*Assistant Examiner* — Alexander Khong
(74) *Attorney, Agent, or Firm* — Lyon & Harr, LLP; Richard T. Lyon

(57) ABSTRACT

Conceptually related term identification technique embodiments are presented that involve identifying in the results of a search query, terms that are conceptually related to the search query terms. In one general embodiment, this is accomplished by first inputting the terms employed in a search query and the results of the search. Word tokens found in the search query terms are then identified, as are potential phrases that can be made from the identified word tokens. Conceptually related words and phrases are then identified in the search query results. These words and phrases correspond to the previously identified word tokens and potential phrases. The search query results are presented to a user on a display device in such a manner as to visually distinguish the conceptually related words and phrases from other words and phrases in the search query results.

19 Claims, 3 Drawing Sheets

US 8,316,039 B2

IDENTIFYING CONCEPTUALLY RELATED TERMS IN SEARCH QUERY RESULTS

BACKGROUND

In a typical search setting, such as in a Search Engine or "Find on this page" or other search environment, a user indicates what they want to find by typing into a search query box or into the Find box. A search application provides results of the search to the user. For example, the results can be displayed on a display device. This displaying can include highlighting, or otherwise indicating, all the places that the query terms are found in the results, in their exact form, or with some morphological variance.

SUMMARY

This Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

Conceptually related term identification technique embodiments described herein generally involve identifying in the results of a search query, terms that are conceptually related to the search query terms. In one general embodiment, this conceptually related term identification is accomplished by first inputting the terms employed in a search query. Word tokens found in the search query terms are then identified, as are potential phrases that can be made from the identified word tokens. The results of the search query are also input. Then, conceptually related words and phrases are identified in the search query results, which correspond to the identified word tokens and potential phrases. Once the conceptually related words and phrases are identified, in one implementation, the search query results are presented to the user on a display device in such a manner as to visually distinguish the conceptually related words and phrases from other words and phrases in the results.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
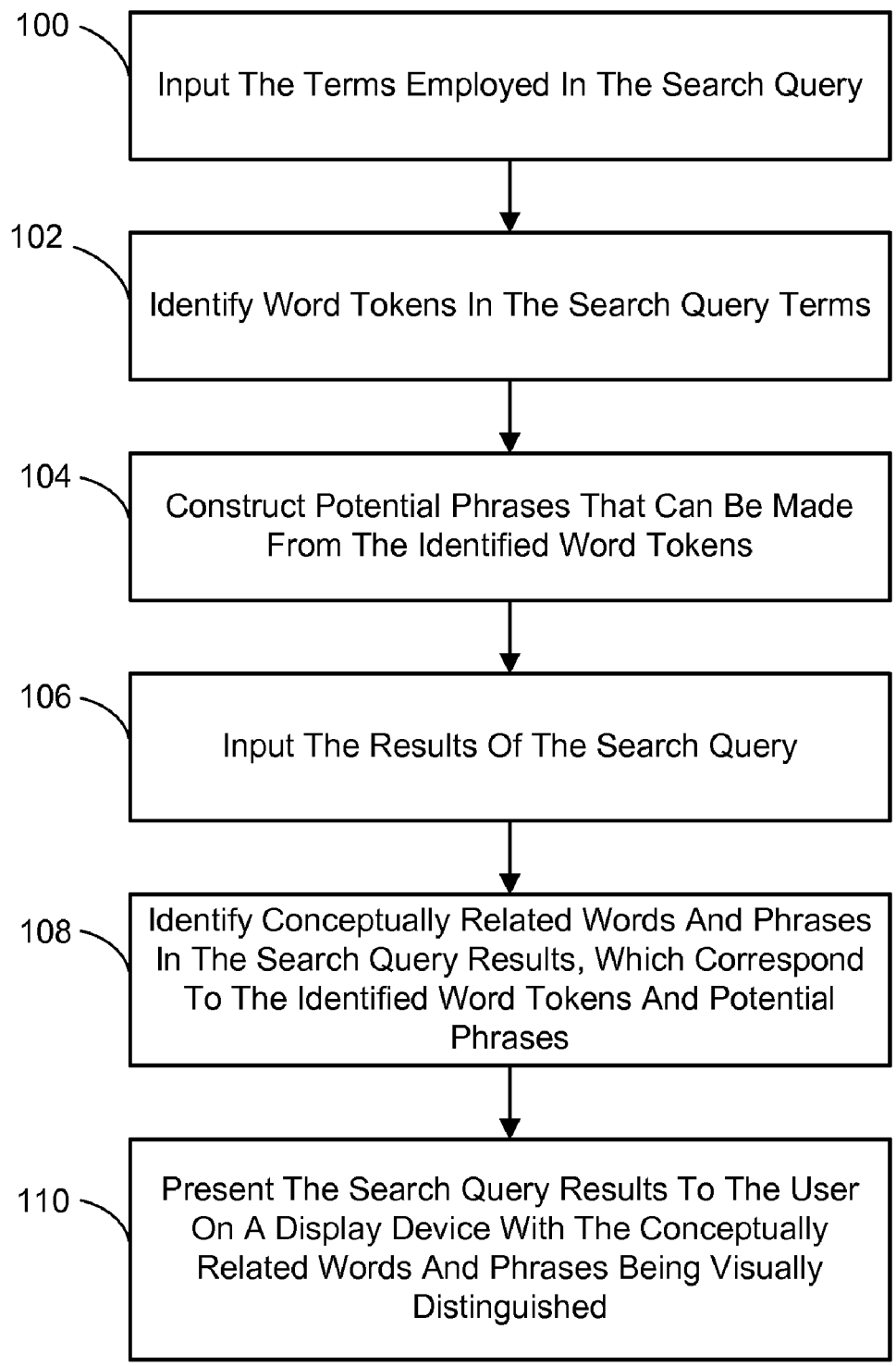
FIG. 1 is a flow diagram generally outlining one embodiment of a process for identifying conceptually related terms in results of a search query.

In the following description of conceptually related term identification technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Conceptually Related Term Identification

In general, the conceptually related term identification technique embodiments described herein are directed toward identifying terms in the results of a search query that are conceptually related to terms included in the search query. The identified conceptually related terms, which can be words or phrases, are then visually distinguished in an appropriate manner (e.g., highlighting, bolding, and so on) when the search results are presented to a user. The search results can be in any form desired. For example, they could be, but are not limited to, text documents or text snippets.

For the purposes of this disclosure, words and phrases that are conceptually related to the terms of a search query include words or phrases that have the same meaning (e.g., "car", related to the query term "automobile"), slang terms (e.g., "winter rat" related to "car"), nicknames (e.g., "Satchmo", related to the query term "Louis Armstrong"), unofficial acronyms (e.g., "POTUS" related to the query term "president (of the United States)"), metonyms (e.g., "White House" related to "president" or "administration"), dialect variants (e.g., "flat", related to the query term "apartment"), taxonomic hypernyms (e.g., "vehicle" related to the query term "car"), hypernym-like classes that do not form part of a scientific taxonomy (e.g., "flightless bird" related to the query term "kiwi), or hyponyms (e.g., "subway", related to the query term "public transportation" or "transit"). However, in one embodiment, the conceptually related words and phrases are not merely synonyms, hyponyms, hypernyms, or other commonly recognized semantic relations exemplified above, or morphological variants of the search query terms. Rather, the conceptually related words and phrases include terms that are characteristically closely associated with the query term, for example, "critical mass" is conceptually related to phrases such "bike rides", the query term "fuel rod" is conceptually related to "nuclear fuel cycle", the query term "Ingrid Bergman" is conceptually related to "Casablanca" and the query term "Louis Armstrong" is conceptually related to "jazz". The conceptually related words and phrases can also be translation equivalents (for example Spanish or French language terms for diseases keyed to English query terms), or can be transliterations of the original terms into another language, or can recover the original language script form of the query term (e.g., for example a Chinese or Japanese proper name written in Chinese or Japanese script, presented as related to query term for that in Latin script, or a name written in Latin script in Japanese text returned as part of a Japanese language query). Further, the conceptually related terms can include closely associated query strings, such as those that are commonly seen in related query suggestions made by search engines that have been discovered by mining query logs.

Identifying words and phrases in search results that are conceptually related to the terms of a search query has considerable advantages. For example, a user does not have to know how the concept or concepts that their query terms signify are expressed in the search results. Rather, the user needs only to enter one term representing a concept. For example, a user might enter "apartments for rent in London" as a search query. However, the search results returned might also contain the word "flat"—a conceptually related word to the query term "apartments". As conceptually related words are identified and can be visually distinguished in the search results, the user's attention would be drawn not only to instances of the word "apartments", but also to instances of the word "flat". This increases the chance that the user will find the information being sought. Another advantage is that it may draw the user's eye to the most relevant of several senses of a term. For example, if a user issues the query "critical mass", the search results may include results relating to both bicycle events and nuclear physics. By visually distinguishing conceptually related terms within the query results, the user is assisted in deciding which results are most relevant, and possibly suggest how the user may refine or modify the query in order to achieve better results.

In one general embodiment, the conceptually related term identification is accomplished as illustrated in FIG. 1. First, terms employed in a search query are input (100). Word tokens found in the search query terms are then identified (102), as are potential phrases that can be made from the identified word tokens (104). The results of the search query are also input (106). Then, conceptually related words and phrases are identified in the search query results, which correspond to the identified word tokens and potential phrases (108). Once the conceptually related words and phrases are identified, in one implementation, the search query results are presented to the user on a display device in such a manner as to visually distinguish them from other words and phrases in the search query results (110).

The foregoing general aspects will be described in more detail in the sections to follow.

1.1 Identifying Words and Potential Phrases

The words and potential phrases identified in the search query terms can be found using a variety of methods. In one implementation, the search query terms are parsed into word tokens. A word token is in general a string of characters that has been identified as likely to be meaningful to humans or useful to the search engine (e.g., corresponding to sequences that will have been indexed by the search engine), and includes what are conventionally considered to be linguistic valid words in the language of the query, as well as valid sequences of alphanumeric and other characters (e.g., "C++", "F#"). However, a word token typically excludes arbitrary strings of punctuation characters, extraneous white spaces, and patterns used to instruct the search engine (for example, the keywords AND or OR). All the phrases that can be made by combining the identified word tokens are then constructed. These phrases can be made up of two word tokens, three word tokens, and so on, up to phrases having a prescribe number of word tokens. Conventionally, these are called bi-gram phrases, tri-gram phrases, and so on up to n-gram phrases, where the "n" represents the largest number of word tokens allowed in the constructed phrase. For example, in tested embodiments, the number of word tokens in a phrase was limited to five. It should be noted that a large number of potential phrases can be constructed in this manner with many making no sense. However, this is not a problem since only coherent phrases will be matched to conceptually related words or phrase, as will be described shortly. The phrases will also usually contain tokens that are considered to be "stop words", that are normally suppressed by search engines, such as "in" and "and" in the 4-gram query string "down and out in Paris". It is also noted that the n-grams may or may not respect quotation marks used to bracket tokens within queries in order to force an exact match.

The word tokens, both individually and in the constructed potential phrases can also be optionally stemmed. Stemming involves reducing any inflected or derived words to their base or root form. Optionally, alternate phrases may be created by generating hyphenation variants ("phone book" vs. "phonebook" vs. "phonebook"), or by correcting possible spelling errors and including these alternates in the words and phrases to be looked up.

1.2 Identifying Conceptually Related Words and Phrases

Conceptually related words and phrases corresponding to the search query terms can be found using a variety of methods. In one implementation, they are found by searching one or more pre-built databases. Generally, these databases include words with one or more conceptually related words listed for each word. Alternately, they can also have phrases with one or more conceptually related phrases listed for each phrase. Or, they can also have both. These databases can be stored locally so that the computing device implementing the conceptually related term identification technique embodiments has direct access to them. Alternately, the databases can be remote with the computing device accessing them through a computer network, such as the Internet or a proprietary intranet. The computing device may even access both local and remote databases to find conceptually related words and phrases.

In another implementation, conceptually related words and phrases corresponding to the search query terms are identified using one or more conceptual relationship discovery techniques. As this method does not rely on a pre-built database, it can find corresponding words or phrases that are more current than may sometimes be possible with a pre-built database. One non-limiting example of a conceptual relationship discovery technique is a term frequency-inverse document frequency (TF.IDF) technique of the kind familiar to practitioners of Information Retrieval. Another non-limiting example is a distributional similarity technique, which may or may not incorporate syntactic analysis.

These conceptual relationship discovery techniques can be implemented locally using the computing device implementing the conceptually related term identification technique embodiments. Alternately, the conceptual relationship discovery techniques can be run remotely with the computing device accessing them through a computer network, such as the Internet or a proprietary intranet. The computing device may even access both local and remote conceptual relationship discovery techniques to find conceptually related words and phrases.

Figure 2:
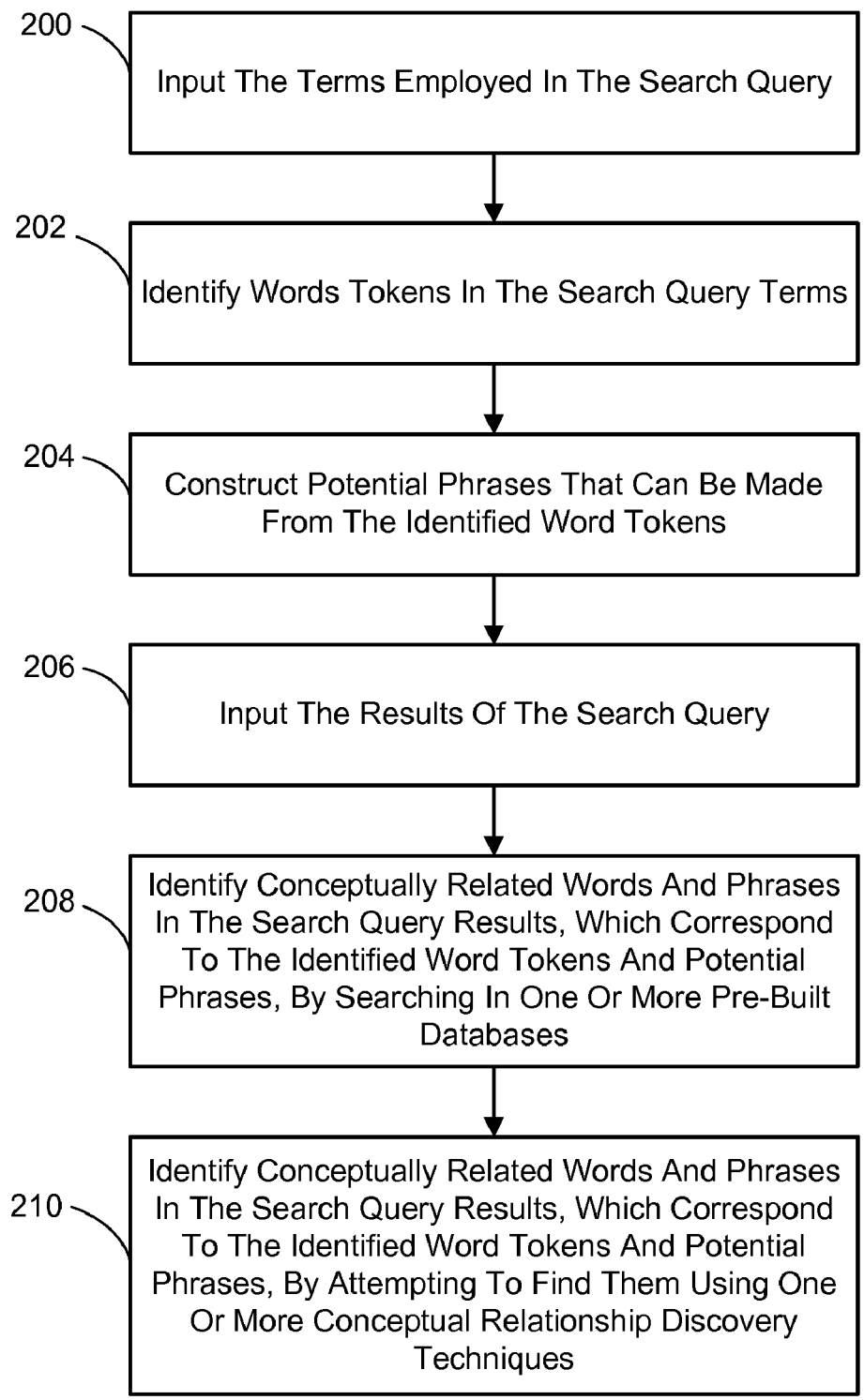
FIG. 2 is a flow diagram generally outlining one embodiment of a process for identifying conceptually related terms in results of a search query, where pre-built databases and conceptual relationship discovery techniques are both used to identify the conceptually related words and phrases.

It is further noted that the use of pre-built databases, or conceptual relationship discovery techniques, need not be exclusive. Rather, conceptually related words and phrases can be identified using both methods. For example, referring to FIG. 2, this combined method can be implemented as follows.

First, terms employed in a search query are input (200). Word tokens in the search query terms are then identified (202), as are potential phrases that can be made from the identified word tokens (204). The results of the search query are also input (206). Then, conceptually related words and phrases are identified in the search query results, which correspond to the identified word tokens and potential phrases, by first searching one or more pre-built databases (208). As described previously, the prebuilt databases include words with one or more conceptually related words listed for each word and/or phrases with one or more conceptually related phrases listed for each phrase. It is also noted that a pre-built database can be accessed either locally or remotely, as described previously. In addition, conceptually related words and phrases are identified in the search query results, which correspond to the identified word tokens and potential phrases, by attempting to find them using one or more conceptual relationship discovery techniques (210). As described previously, a call to a conceptual relationship discovery technique can be local or remote.

1.3 Presenting Conceptually Related Words and Phrases to a User

The identified conceptually related words and phrases are not used to expand the search query term set so as to produce additional search results. Rather, once the search query terms are used to produce a set of search results, instances of the discovered conceptually related words and phrases are identified within the results. Typically, search query terms are highlighted or visually distinguished in some way within the search results displayed to the user. In the case of the conceptually related term identification technique embodiments described herein, the conceptually related terms and phrases found to correspond to the search query terms are visually distinguished within the displayed search results as well to assist the user in determining relevance of a search results item or in finding relevant portions within a search results item. It is further noted that, if desired, just the conceptually related terms could be visually distinguished and not the search query terms.

Any appropriate display mechanism that calls the user's attention to instances of the identified conceptually related terms and phrases can be employed. For example, the display mechanism can be, but is not limited to, identifying conceptually related terms and phrases with boldfacing, or moving the cursor from one instance of the conceptually related terms and phrases to another, or highlighting the conceptually related terms and phrases. It is also noted that in an implementation where both the search query terms and the conceptually related terms and phrases are visually distinguished from the other text of the search results, the search query terms can be distinguished in a manner that is different from the conceptually related terms and phrases. Further, in one implementation, different types of conceptually related terms are distinguished by the use of color coded highlighting. For example, synonyms are highlighted in one color, other more remote kinds of relations in another color. Similarly, conceptually related terms can be distinguished with regard to their source. For example, items found in a static database are highlighted in one color, while newer items found by dynamic methods are highlighted in another color. Or if the source is known, the conceptually related terms can be distinguished by color or intensity based on the relative reliability of the source.

In one implementation, the computing device that identifies the conceptually related words and phrases, also displays the search results and visually distinguishes the conceptually related words and phrases. However, this need not be the case. In another implementation, the computing device that identifies the conceptually related words and phrases simply specifies their locations within the search query results. In one version, these location specifications are then transmitted to another computer or computers, either directly or via a computer network. The other computer or computers then present the search query results to a user on a display device in such a manner as to visually distinguish the identified conceptually related words and phrases from other words and phrases in the search query results. This can be accomplished as described above.

Further, in implementations where the computing device that identifies the conceptually related words and phrases does so by specifying their locations within the search query results, an opportunity exists for filtering these words and phrases. In one filtering implementation, the conceptually related words and phrases location specifications are filtered based on prescribed criteria to identify unwanted words and phrases. Then, only the conceptually related words and phrases not identified as unwanted are presented in the search query results to the user.

2.0 The Computing Environment

A brief, general description of a suitable computing environment in which portions of the conceptually related term identification technique embodiments described herein may be implemented will now be described. The technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 3:
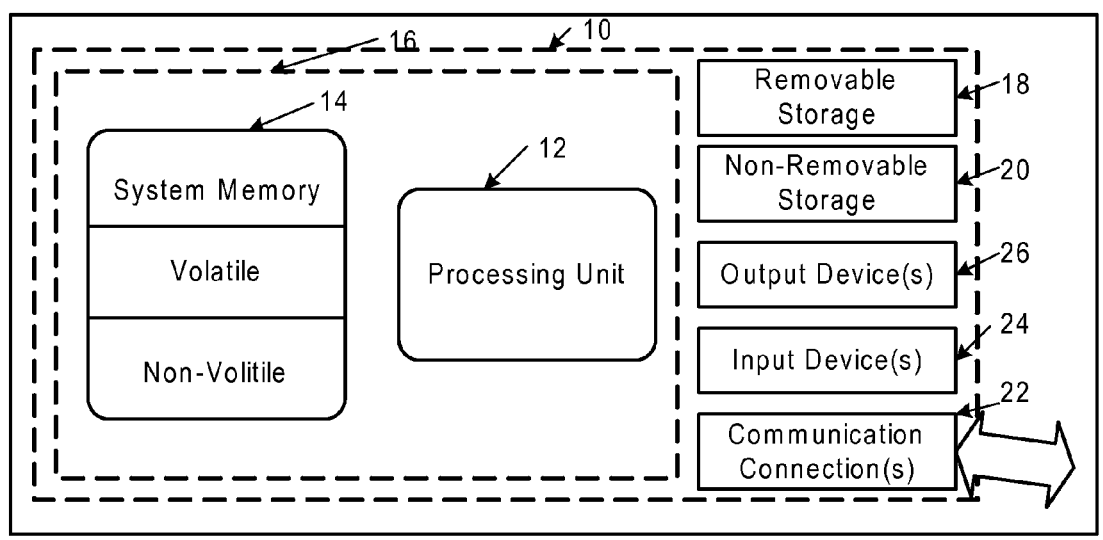
FIG. 3 is a diagram depicting a general purpose computing device constituting an exemplary system for implementing conceptually related term identification technique embodiments described herein.

FIG. 3 illustrates an example of a suitable computing system environment. The computing system environment is only one example of a suitable computing environment and is not intended to suggest any limitation as to the scope of use or functionality of conceptually related term identification technique embodiments described herein. Neither should the computing environment be interpreted as having any dependency or requirement relating to any one or combination of components illustrated in the exemplary operating environment. With reference to FIG. 3, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 3 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 3 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well know in the art and need not be discussed at length here.

The conceptually related term identification technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

3.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for identifying conceptually related terms in results of a search, comprising:
using at least one computer to perform the following process actions:
inputting a search query from a user;
initiating the performance of a search of one or more databases using the search query as input from the user to produce search results;
accessing the search results produced from the completed search performed using the search query as input from the user;
identifying terms corresponding to the search query employed in the completed search;
identifying word tokens in the search query terms;
identifying potential phrases that can be made from the identified word tokens in the search query terms;
identifying conceptually related words and phrases in the search results corresponding to the identified word tokens and potential phrases; and
specifying the locations of the conceptually related words and phrases within the search results.

2. The process of claim 1, further comprising a process action of presenting the search results to a user on a display device in such a manner as to visually distinguish the identified conceptually related words and phrases from other words and phrases in the search results.

3. The process of claim 1, further comprising a process action of transmitting the location specifications of the conceptually related words and phrases to another computer, wherein the other computer presents the search results to a user on a display device in such a manner as to visually distinguish the identified conceptually related words and phrases from other words and phrases in the search results.

4. The process of claim 1, further comprising a process action of transmitting the location specifications of the conceptually related words and phrases to another computer, wherein the other computer filters the conceptually related words and phrases based on a prescribed criteria to identify unwanted words and phrases, and other computer then presents the search results to a user on a display device in such a manner as to visually distinguish the identified conceptually related words and phrases, which were not identified as unwanted, from other words and phrases in the search results.

5. The process of claim 1, wherein the process action of identifying conceptually related words and phrases in the search results corresponding to the identified word tokens and potential phrases, comprises an action of searching one or more local, pre-built databases, wherein each database comprises word tokens with one or more conceptually related words listed for each word token therein and/or phrases with one or more conceptually related phrases listed for each phrase therein.

6. The process of claim 1, wherein the process action of identifying conceptually related words and phrases in the search results corresponding to the identified word tokens and potential phrases, comprises an action of searching one or more remote, pre-built databases, via a computer network, wherein each database comprises word tokens with one or more conceptually related words listed for each word token therein and possibly phrases with one or more conceptually related phrases listed for each phrase therein.

7. The process of claim 1, wherein the process action of identifying conceptually related words and phrases in the search results corresponding to the identified word tokens and potential phrases, comprises an action of, for each identified word token and potential phrase, finding one or more conceptually related words and/or phrases using one or more conceptual relationship discovery techniques.

8. The process of claim 7, wherein the process action of finding one or more conceptually related words and possibly phrases using one or more conceptual relationship discovery techniques, comprises employing local resources.

9. The process of claim 7, wherein the process action of finding one or more conceptually related words and possibly phrases using one or more conceptual relationship discovery techniques, comprises employing remote resources via a computer network.

10. The process of claim 1, wherein the process action of identifying conceptually related words and phrases in the search results corresponding to the identified word tokens and potential phrases, comprises the actions of:
for each identified word and potential phrase,
searching one or more remote, pre-built databases, wherein each database comprises words with one or more conceptually related words listed for each word therein and/or phrases with one or more conceptually related phrases listed for each phrase therein; and
finding one or more conceptually related words and/or phrases using one or more conceptual relationship discovery techniques.

11. The process of claim 1, further comprising the process actions of:
presenting the search results to a user on a display device in such a manner as to visually distinguish the identified conceptually related words and phrases from other words and phrases in the search results by the use of highlighting; and wherein
different types of conceptually related words and phrases are highlighted using different colors.

12. The process of claim 1, further comprising the process actions of:
presenting the search results to a user on a display device in such a manner as to visually distinguish the identified conceptually related words and phrases from other words and phrases in the search results by the use of highlighting; and wherein
conceptually related words and phrases are highlighted using different colors depending on their source.

13. The process of claim 1, further comprising the process actions of:

presenting the search results to a user on a display device in such a manner as to visually distinguish the identified conceptually related words and phrases from other words and phrases in the search query results by the use of highlighting; and wherein conceptually related words and phrases are highlighted using different colors depending on the relative reliability of their source.

14. The process of claim 1, wherein the process action of identifying potential phrases that can be made from the identified words in the search query terms, comprises identifying all the phrases that can be constructed from the identified word tokens, up to a prescribed n-gram limit.

15. The process of claim 14, further comprising a process action of stemming the word tokens both individually and in the constructed phrases prior to performing the action of identifying conceptually related words and phrases.

16. The process of claim 1, wherein the process action of accessing the search results produced from the completed search performed, comprises an action of accessing the search results in the form of text documents.

17. The process of claim 1, wherein the process action of accessing the search results produced from the completed search performed, comprises an action of accessing the search results in the form of text snippets.

18. A system for identifying conceptually related terms in results of a search, comprising:

a computing device; and a computer program comprising program modules executable by the computing device, wherein the computing device is directed by the program modules of the computer program to, input a search query from a user;

initiate the performance of a search of one or more databases using the search query as input from the user to produce search results;

access the search results produced from the completed search performed using the search query as input from the user;

identify terms corresponding to the search query employed in the completed search;

identify words in the search query terms;

identify potential phrases that can be made from the identified words in the search query terms;

identify non-synonymic, non-morphological, conceptually related, words and phrases in the search results corresponding to the identified words and potential phrases; and present the search results to the user on a display device in such a manner as to visually distinguish the identified conceptually related words and phrases from other words and phrases in the search results.

19. A computer-implemented process for identifying conceptually related terms in results of a search, comprising:

using a computer to perform the following process actions:

inputting a search query from a user;

initiating the performance of a search of one or more databases using the search query as input from the user to produce search results;

accessing the search results produced from the completed search performed using the search query as input from the user;

identifying terms corresponding to the search query employed in the completed search;

identifying word tokens in the search query terms;

constructing potential phrases that can be made from the identified word tokens;

identifying non-synonymic, non-morphological, conceptually related words and phrases in the search results corresponding to the identified word tokens and potential phrases, wherein said identification of the conceptually related words and phrases comprises, for each identified word token and potential phrase, searching one or more pre-built databases, wherein each database comprises words with one or more conceptually related words listed for each word therein and/or phrases with one or more conceptually related phrases listed for each phrase therein, and attempting to find one or more conceptually related words and/or phrases using one or more conceptual relationship discovery techniques; and specifying the locations of the conceptually related words and phrases within the search results.

\* \* \* \* \*